Patented Oct. 20, 1942

2,299,167

UNITED STATES PATENT OFFICE 2,299,167

BRAZING LIGHT METALS

Mike A. Miller, New Kensington, Pa., assignor to Aluminum Company of America, Pittsburgh, Pa., a corporation of Pennsylvania No Drawing. Application July 30, 1940,
Serial No. 348,548

11 Claims. (Cl. 148—26)

This invention relates to the art of joining a plurality of metallic members, and it is more particularly concerned with brazing light metal parts. The term, "light metal," as it is used hereinafter, is intended to embrace both commercially pure aluminum and magnesium, and alloys containing at least 50 per cent by weight of either metal.

Brazing, as generally understood in the art, consists of joining metal parts by fusing a lower melting point metal between them without an appreciable fusion of the parent metal. It is distinguished from welding on the one hand because there is substantially no melting of the parent metal, and it does not resemble soft soldering on the other hand because it is performed at higher temperatures and on different types of filler metal. In a brazing operation where a flux is used, the parts to be joined are usually first coated with flux and assembled with a piece of brazing metal between the juxtaposed parts or at the edge of the areas to be joined. The brazing or filler metal may alternatively be added as a powder, wire, strip, or sheet, or may take the form of a metal coating upon the parts being joined. Where large quantities of articles are to be brazed, the assembled articles are then put into a furnace or other heating medium which causes a fusion of the flux and of the joining or brazing metal. Brazing is to be distinguished from the customary soft soldering operation, which is usually conducted at much lower temperatures, where the molten solder is supplied to areas to be joined along with a flux, and the fluid substances are often worked over the area being soldered by a suitable tool. The soundness of the soldered joint may thus depend in part upon mechanical agitation of both the flux and solder, whereas in brazing one must rely solely on the behavior of the flux and molten metal apart from external agitation.

A satisfactory brazing flux should, in general, possess the following physical properties. It must flow at a temperature somewhat below the melting point of the brazing metal. It must adhere to or wet the surfaces of the metals being joined. It must facilitate the spreading and alloying of the fused brazing metal over the surfaces of the metallic parts to be joined. It should also remove any oxide coating or other adherent foreign matter present on the metal parts in order to establish a metal-to-metal contact between the brazing metal and the parts being joined, but it should not appreciably attack the metal, and it should also protect the cleansed surface against re-oxidation. Finally, any residue of the flux remaining after completion of the joining should be readily removable. This flux residue, if not removed, is likely to cause corrosion of the metal and brazed joint upon continued exposure to a damp atmosphere or other like media with which the brazed article may come into contact.

It has not been possible heretofore to braze articles made from aluminum or magnesium or alloys wherein these metals predominated, chiefly because of the difficulty encountered in removing the adherent and resistant film of oxide found on the surface of these metals. Furthermore, a number of alloys that would be satisfactory as a joining material from the standpoint of resistance to corrosion have too high melting points to be used with soldering fluxes, while on the other hand, in many instances, the melting points of the alloys suitable for brazing are too low for successful use with known welding fluxes. The problem of removing the oxide film is more acute in brazing than in soldering since in soldering of light metals both flux and solder are usually agitated by the soldering tool or by vaporization of copious amounts of volatile reaction products. This agitation aids in breaking up and removing the oxide film and permits the solder to come immediately into intimate contact with the light metal where the oxide has been removed. Such a procedure is not possible in the brazing operation because the fusion of the joining metal is usually effected in a furnace or other medium which precludes agitation with a tool. There the brazing flux must act of its own accord to remove completely the oxide coating; when this removal has been effected, the flux causes the molten brazing metal to spread evenly between and over the surfaces to be joined.

Soldering fluxes have been found to be unsuitable for brazing purposes. Many of them are unstable at the higher temperatures used in the brazing operation. That is, they either vaporize, decompose, or run away before the brazing temperature is reached. Other soldering fluxes are of the type known as reaction fluxes and contain relatively large amounts of heavy metal salts, cadmium chloride for example. The heavy metal salts decompose with a resultant deposit of heavy metal which either serves as the solder or as an interfacial layer between the solder and metal surfaces being joined or it may alloy with the solder and alter the properties of the solder. When brazing light metals, such deposition of heavy metal is undesirable because it weakens the joint and renders it more susceptible to corrosion.

It is an object of my invention to provide a method of brazing of light metal members. Moreover, it is an object of my invention to provide a brazing flux which, without external agitation, removes the oxide coating and any adherent foreign matter present on light metal surfaces with a high degree of efficiency. Another object of my invention is to promote the spread of the molten brazing metal over the metallic parts to be joined by means of a flux which will cause the brazing metal to come into intimate contact with the surface of the metal being joined. Still another object is the provision of a flux that makes it possible to use as filler material corrosion resistant alloys, such as aluminum or magnesium base alloys, at lower temperatures than prevail in welding operations. A further object is to provide a flux suitable for furnace brazing operations.

Other objects of this invention will become apparent from the following description and appended claims.

In my copending application, Serial No. 348,546 filed July 30, 1940, I have described the brazing of light metal members wherein a flux is employed that contains relatively small amounts of an alkali metal fluoride and cadmium chloride, cadmium bromide, and/or cadmium fluoride in a carrier or vehicle composed of alkali metal chlorides. The particular flux composition set forth in that application is one containing from 1 to 30 per cent of at least one alkali metal fluoride, but not more than 15 percent if the salt is a normal fluoride, 0.01 to 16 per cent of cadmium chloride, 6 to 12 per cent being preferred, 0.01 to 24 per cent cadmium bromide, 8 to 14 per cent being preferred, 0.01 to 13 per cent of cadmium fluoride, 2 to 7 per cent being preferred, the total amount of the cadmium salts calculated on the basis of cadmium concentration not exceeding a cadmium content of about 9.8 per cent, and at least two chlorides of the group consisting of 5 to 60 per cent of sodium chloride, 5 to 60 per cent of potassium chloride, and 5 to 80 per cent of lithium chloride. This flux will hereinafter be referred to as the basic composition.

I have now discovered that light metal articles can be brazed in an even more satisfactory manner if there be added to the basic composition a very small amount, from about 0.01 to 0.5 per cent, of at least one halide of the group of metals other than cadmium below aluminum in the electromotive series of metals. The new flux which results from this addition retains the efficient cleansing characteristics of the basic composition and removes any oxide film and adhering foreign matter, such as grease, without agitation by external means. The effect of the addition of this small quantity of a halide may, as a whole, be described as an increase in the activity of the flux. The small amount of halide appears to accelerate or catalyze the action of the cadmium salt or salts. One manifestation of this action is an increase in the wetting power of the flux which in turn causes the fused brazing metal to flow more readily.

The metals below aluminum in the electromotive series in addition to cadmium are manganese, zinc, chromium, iron, cobalt, nickel, tin, lead, copper, arsenic, bismuth, antimony, mercury, silver, palladium, platinum, and gold. Although all of the halides of these metals produce the desired effect yet it is not feasible to use all of them. Palladium, platinum, and gold halides are too costly to justify commercial use; mercury halides introduce a corrosion hazard if light metal members are being joined and the use of arsenic halides presents a serious poison hazard. The amount of halide to be added within the specified limits will vary with the different metal constituents thereof and, similarly, the choice of a particular halide to be added will be determined by the nature of the flux, the brazing metal, and the members being joined. As a general rule, the amount of this addition will vary from about 0.01 to 0.5 per cent but 0.05 per cent is preferred as the lower limit, and the preferred range is from about 0.05 to 0.3 per cent. Where a tin halide is employed, however, the amount should not exceed about 0.05 per cent since a larger amount causes an objectionable black stain on the joint and adjacent metal covered by the flux. Where two or more of the foregoing halides are used, the total amount should not exceed about 0.5 per cent.

The choice of the particular halide to be added will be determined in large part by the composition of the metals being brazed, since the addition of certain of these halides provides a flux better adapted for use with one metal or alloy than with another. For example, when brazing light metal alloys containing manganese, it appears desirable to add a small amount of tin chloride to the flux. When brazing light metal alloys containing magnesium, or magnesium and silicon, lead chloride may be added with good effect.

A variety of brazing or filler metals may be used in forming brazed joints by the practice of this invention providing they have melting points below that of the metal being brazed, and that they further possess such other requisite properties as adherence to the parent metal by alloying therewith, strength, and resistance to corrosion. Generally, the filler metal has the same base as the parent metal, and hence has a higher melting point than soft solders. Thus, the temperature at which the joint is formed generally lies between 950° F., or in any event, the melting point of the filler metal, and the temperature at which the parent metal begins to fuse. It is usually desirable to form the joint at a temperature giving proper fluidity of the filler metal without approaching the fusion temperature of the parent metal too closely since at that temperature that metal is soft and easily deformed. In most instances it has been found that very satisfactory results are obtained by using aluminum base alloys as filler material for joining aluminum or aluminum base alloy members, and magnesium base alloys for brazing magnesium or magnesium base alloy parts. Some binary aluminum base alloys that have given satisfactory results on aluminum are those containing about 5 to 13 per cent silicon and 87 to 95 per cent aluminum which contains the usual impurities.

The flux compositions herein disclosed should have a maximum melting point of about 1180° F., if the melting point of the filler metal is 1200° F. or higher, but if the filler metal has a lower melting point, the composition of the flux should be adjusted in order to reduce the melting point of the flux to a correspondingly lower temperature. In other words, the melting point of the flux should always be lower than the melting point of the filler metal in order to insure proper action of the flux. Generally, fluxes which melt between 950 and 1100° F. will be satisfactory for brazing most light metal members.

Through the use of a brazing flux of the composition recited herein and a suitable filler metal, it thus becomes possible to produce in all cases a strong brazed joint either between light metal members or between these metals and such other metal as iron and copper, for example. This flux is also well adapted for use with brazing or filler metals of varying composition, especially those alloys containing aluminum or magnesium as the predominant component. The flux compositions mentioned hereinabove have a melting point range which makes possible the utilization of corrosion resistant alloys as the brazing or filler metal. Heretofore the only fluxes which could be successfully employed with these corrosion resistant alloys were those fluxes having melting points so high as to restrict their utility to welding operations. By using the flux disclosed herein it thus becomes possible to produce strong corrosion resistant joints in the ordinary furnace brazing operation as well as by other brazing methods.

As illustrative of the particular embodiment of this invention, a preferred flux composition for joining aluminum base alloys containing manganese (for example, 1.2% Mn, balance Al with usual impurities) is:

(1) 24% NaCl, 52% KCl, 8% LiF, 15.95% CdCl$_2$, 0.05% SnCl$_2$.

A preferred flux composition for use in joining aluminum base alloys containing magnesium and chromium (for example, 2.5% Mg, 0.25% Cr, and balance Al with usual impurities) is:

(2) 29% NaCl, 50% KCl 8% LiF, 12.9% CdCl$_2$, 0.1% PbCl$_2$.

The approximate minimum brazing temperature which may be used with the fluxes of the illustrated compositions is 1100° F., but by varying the proportion of the components of the carrier or vehicle, other similar fluxes may be prepared having different minimum brazing temperatures as the nature of the brazing alloy and of the members being joined may demand.

As an example of the manner in which an aluminum base alloy containing magnesium (2.5% Mg, 0.25% Cr, balance Al with usual impurities) can be brazed, I will describe a particular brazing operation for making a T-shaped joint in which the flux numbered (2) above was used. Two pieces of sheet were covered with the flux in the form of a water paste along the portions that were to be joined. They were then mounted in a jig to hold the pieces in an inverted T-shape position, and a wire of the brazing alloy (10% Si, 90% Al) was placed at the junction of the two strips. The entire assembly was then placed in a furnace and heated to 1130° F. for 15 minutes. Upon withdrawal of the assembly from the furnace and cooling to room temperature, it was found that the operation had resulted in the production of a sound joint and a symmetrical fillet of brazing metal had been formed on both sides of the joint. The entire flux residue was readily washed away from the newly formed joint.

In a similar manner, two strips of magnesium were brazed by using the flux in Example 1 and a suitable magnesium base alloy filler metal. The assembled strips were heated in a furnace at 1120° F. for 10 minutes. A sound well filleted joint was produced in this manner.

The examples given hereinabove are intended to illustrate my invention and not to restrict it or the appended claims.

I claim:

1. A method of producing a brazed joint between metallic members at least one of which consists of a light metal, comprising effecting the brazing in the presence of an inorganic salt flux containing at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, than the same flux devoid of said halide component.

2. A method of producing a brazed joint between metallic members at least one of which consists of a light metal, comprising effecting the brazing in the presence of an inorganic salt flux containing at least one alkali metal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, than the same flux devoid of said halide component.

3. A method of producing a brazed joint between light metal members comprising effecting the brazing in the presence of an inorganic salt flux containing at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, than the same flux devoid of said halide component.

4. A method of furnace brazing light metal members comprising effecting the brazing in the presence of an inorganic salt flux containing at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, than the same flux devoid of said halide component.

5. A method of producing a brazed joint between metallic members at least one of which consists of a light metal, comprising effecting the brazing in the presence of an inorganic salt flux containing from 1 to 30 per cent of at least one alkali metal fluoride but not more than 15 per cent of a normal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, then the same flux devoid of said halide component.

6. A method of producing a brazed joint between light metal members comprising effecting the brazing in the presence of an inorganic salt flux containing from 1 to 30 per cent of at least one alkali metal fluoride but not more than 15 per cent of a normal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.0 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.5 per cent of at least one halide of the group of metals below aluminum in the electromotive series in addition to cadmium, the total amount of said halides not exceeding about 0.5 per cent, said flux being adapted to wet said members more effectively, in view of the presence of at least one of the last named group of halides within the aforesaid proportions, than the same flux devoid of said halide component.

7. A flux for brazing light metals containing from 1 to 30 per cent of at least one alkali metal fluoride but not more than 15 per cent of a normal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.5 per cent of at least one halide of the group of metals below aluminum in the electromotive series in addition to cadmium, the total amount of said halides not exceeding about 0.5 per cent, said flux being characterized by an increased wetting power, in view of the presence of at least one of the last named group of halides within the aforesaid proportions, as compared to the same flux devoid of the said halide component.

8. A flux for brazing light metals containing from 1 to 15 per cent of at least one normal alkali metal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of the cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.5 per cent of at least one halide of the group of metals below aluminum in the electromotive series in addition to cadmium, the total amount of said halides not exceeding about 0.5 per cent, said flux being characterized by an increased wetting power, in view of the presence of at least one of the last named group of halides within the aforesaid proportions, as compared to the same flux devoid of the said halide component.

9. A flux for brazing light metals containing from 1 to 15 per cent of at least one normal alkali metal fluoride, at least one of the group of cadmium salts consisting of cadmium chloride, cadmium bromide, and cadmium fluoride in the proportions of 6 to 12 per cent cadmium chloride, 8 to 14 per cent cadmium bromide, and 2 to 7 per cent cadmium fluoride, the total amount of said cadmium salts calculated on the basis of the cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.2 per cent of at least one halide of the group of metals below aluminum in the electromotive series in addition to cadmium, the total amount of said halides not exceeding about 0.5 per cent, said flux being characterized by an increased wetting power, in view of the presence of at least one of the last named group of halides within the aforesaid proportions, as compared to the same flux devoid of the said halide component.

10. A flux for brazing light metals containing from 1 to 30 per cent of at least one alkali metal fluoride but not more than 15 per cent of a normal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.5 per cent of lead chloride, said flux being characterized by an increased wetting power, in view of the presence of lead chloride within the aforesaid proportions, as compared to the same flux devoid of said lead chloride.

11. A flux for brazing light metals containing from 1 to 30 per cent of at least one alkali metal fluoride but not more than 15 per cent of a normal fluoride, at least one of the group of cadmium salts consisting of cadmium chloride, cadmium bromide, and cadmium fluoride in the proportions of 0.01 to 16 per cent cadmium chloride, 0.01 to 24 per cent cadmium bromide, and 0.01 to 13 per cent cadmium fluoride, the total amount of said cadmium salts calculated on the basis of the cadmium concentration not exceeding a cadmium content of about 9.8 per cent, at least two alkali metal chlorides of the group consisting of sodium chloride, potassium chloride, and lithium chloride in the proportions of 5 to 60 per cent sodium chloride, 5 to 60 per cent potassium chloride, and 5 to 80 per cent lithium chloride, and from 0.01 to 0.05 per cent of tin chloride, said flux being characterized by an increased wetting power, in view of the presence of tin chloride within the aforesaid proportions, as compared to the same flux devoid of said tin chloride.

MIKE A. MILLER.

CERTIFICATE OF CORRECTION.

Patent No. 2,299,167.   October 20, 1942.

MIKE A. MILLER.

It is hereby certified that error appears in the printed specification of the above numbered patent requiring correction as follows: Page 4, first column, line 59, claim 6, for "9.0" read --9.8--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.